United States Patent
Tokunaga et al.

(10) Patent No.: US 7,759,007 B2
(45) Date of Patent: Jul. 20, 2010

(54) CATHODE ACTIVE MATERIAL AND LITHIUM ION SECONDARY BATTERY

(75) Inventors: Takashi Tokunaga, Fukushima (JP); Yoshiaki Obana, Fukushima (JP); Hiroyuki Akashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 465 days.

(21) Appl. No.: 11/613,064

(22) Filed: Dec. 19, 2006

(65) Prior Publication Data

US 2007/0141469 A1   Jun. 21, 2007

(30) Foreign Application Priority Data

Dec. 20, 2005   (JP) .............................. 2005-367185

(51) Int. Cl.
*H01M 4/58* (2010.01)
(52) U.S. Cl. ................. 429/231.1; 429/231.3; 429/223; 429/224; 429/231.5; 429/231.6; 429/229; 429/217; 429/338; 423/594.3; 423/594.1; 423/594.5
(58) Field of Classification Search .............. 429/231.1, 429/231.3, 223, 224, 231.5, 231.6, 229, 217, 429/338; 423/594.3, 594.1, 594.5
See application file for complete search history.

(56) References Cited

U.S. PATENT DOCUMENTS

| | | | | |
|---|---|---|---|---|
| 6,632,571 B2 * | 10/2003 | Noh | | 429/338 |
| 7,217,480 B2 * | 5/2007 | Han et al. | | 429/330 |
| 7,279,249 B2 * | 10/2007 | Kim et al. | | 429/231.95 |
| 7,309,543 B2 * | 12/2007 | Shizuka | | 429/223 |
| 2005/0277026 A1 * | 12/2005 | Nishikawa et al. | | 429/231.3 |

FOREIGN PATENT DOCUMENTS

| | | | |
|---|---|---|---|
| JP | 2000-21407 | * | 1/2000 |
| JP | 2004-247292 | | 9/2004 |
| WO | WO03/019731 | | 3/2003 |

* cited by examiner

*Primary Examiner*—Laura S Weiner
(74) *Attorney, Agent, or Firm*—K&L Gates LLP

(57) ABSTRACT

A lithium ion secondary battery is provided. The battery includes a positive electrode having at least a cathode active material and a binder, a negative electrode, an electrolyte, and a separator which are arranged between the positive electrode and the negative electrode, and in which an open circuit voltage per unit cell in a full charging state lies within (4.25V≦voltage≦6.00V). The cathode active material includes either a lithium-cobalt composite oxide expressed by a general formula: $Li_aCo_{1-x}Me_xO_{2-b}$ (Me denotes metal elements of at least one, two or more kinds selected from V, Cu, Zr, Zn, Mg, Al, and Fe; 0.9≦a≦1.1; 0≦x=0.3; and −0.1≦b≦0.1) or a lithium-cobalt-nickel-manganese oxide expressed by a general formula: $Li_aNi_{1-x-y-z}Co_xMn_yMe_zO_{2-b}$ (0.9≦a≦1.1; 0<x<0.4; 0<y<0.4; 0<z<0.3; and −0.1≦b≦0.1). The binder includes a polyacrylonitrile resin.

11 Claims, 4 Drawing Sheets

CATHODE ACTIVE MATERIAL AND LITHIUM ION SECONDARY BATTERY

CROSS REFERENCES TO RELATED APPLICATIONS

The present application claims priority to Japanese Patent Application JP 2005-367185 filed in the Japanese Patent Office on Dec. 20, 2005, the entire contents of which are incorporated herein by reference.

BACKGROUND

The present disclosure relates to a lithium ion secondary battery and, more particularly, to a positive electrode which can be applied to a lithium ion secondary battery.

In recent years, in association with the spread of portable information electronic apparatuses such as the cellular phone, the video camera, notebook-sized personal computers, and the like, the realization of advanced performance, miniaturization, and light-weight of the apparatus has rapidly been progressing. An expendable primary battery or a secondary battery which can be repetitively used, is used in each of power sources which are used in those apparatuses. Among them, a demand for a lithium ion secondary battery is increasing.

In recent years, in order to realize the higher advanced performance of the portable information electronic apparatuses, particularly, (1) realization of a high-energy density of the lithium ion secondary battery and (2) improvement of cycle characteristics are demanded. Herein, (1) the realization of the high-energy density of the lithium ion secondary battery and (2) the improvement of the cycle characteristics are explained.

(1) The Realization of a High-Energy Density of the Lithium Ion Secondary Battery.

Use of a positive electrode having a large discharge capacitance per unit volume is one effective method for realizing high-energy density. To realize such a positive electrode, it has been known that (a) selection of an active material; and (b) an increase in charge upper limit voltage are important. In recent years, much attention has been paid to studying high energy by increasing a charge in upper limit voltage.

As far as cathode active materials of the lithium ion secondary battery, besides $LiCoO_2$ and the like, $LiNiO_2$, $LiMn_2O_4$, and the like are known. According to $LiNiO_2$, although its capacitance is equal to about 190 mAhg$^{-1}$ and is relatively large, it is necessary to reduce the discharge cut-off voltage in order to obtain the capacitance. However, since an average discharge voltage is low, it is unsuitable for an application of the notebook-sized personal computer and the like in which a high electric power is necessary. According to $LiMn_2O_4$, since its capacitance is small, it is unsuitable for the purpose of realizing the high-energy density of the lithium ion secondary battery.

For the above reasons, a transition metal oxide containing lithium such as $LiCoO_2$ or the like in which the average discharge voltage is high is desirable as a lithium ion secondary battery of a high-charge voltage for use in application of the notebook-sized personal computer. In the lithium ion secondary battery in which $LiCoO_2$ is used as a cathode active material and a carbon material is used as an anode active material, a charge final voltage lies within a range from 4.1 to 4.2 V. In such a charge condition, the capacitance of the positive electrode of only about 50 to 60% of a theoretical capacitance is used. Therefore, if the charge voltage can be raised, the capacitance of the positive electrode of 70% or more of the theoretical capacitance can be used. The high capacitance and the higher-energy density of the lithium ion secondary battery can be realized.

For example, as disclosed pamphlet of International Publication WO03/019713, a fact that the high-energy density appears by setting the voltage upon charging to 4.30 V or higher is known.

(2) The Improvement of the Cycle Characteristics

In the lithium ion secondary battery, an assembly in which an aluminum foil serving as a collector has been coated with a positive electrode mixture consisting of a cathode active material such as a transition metal composite oxide containing lithium or the like, a binder such as a fluororesin or the like, a conductive material, and the like is used. For example, in JP-A-2004-247292, there has been disclosed a technique in which the cycle characteristics can be improved by adding a precipitation inhibitor containing a copolymer of α-olefin and α,β-unsaturated carboxylic acid into the positive electrode mixture.

SUMMARY

However, there is a "problem peculiar to the present battery system" in which when the charge voltage of the lithium ion secondary battery in the related art which operates at the maximum voltage of 4.2V is set to a value over 4.20V, a discharge amount of the voltage which can be extracted per cycle decreases.

As factors of such a problem, the following plurality of factors are considered: an increase in electron transfer resistance due to a decrease in contact area of the active material, conductive material, or collector; alteration of the electrolytic solution; an increase in diffusion resistance due to an increase in surface coating; and the like. Among those factors, as factors of the increase in electron transfer resistance due to the decrease in contact area of the active material, conductive material, or collector, it is considered as one of the factors that the adhesion of the positive electrode mixture in the high oxidation atmosphere deteriorates due to an increase in upper limit voltage upon charging.

In the battery using a PVDF (polyvinylidene fluoride) binder as a fluororesin, experiment were performed with charge/discharge cycles at the upper limit voltage of 4.2V and at the charge voltage higher than the upper limit voltage of 4.2V. The battery after completion of the charge/discharge cycles was disassembled and the positive electrode was taken out. Thus, it could be confirmed that in the case of the battery in which the charge/discharge cycles have been performed at the charge voltage higher than 4.2V, a degree of peel-off of the positive electrode mixture from the collector is remarkable.

As mentioned above, it has been found out that in the case of using the PVDF binder as a fluororesin, the adhesion of the positive electrode mixture deteriorates, and in the case where the charge/discharge cycles are performed at the charge voltage higher than the upper limit voltage of 4.2V, the cycle characteristics deteriorate remarkably. It has been also found that in the battery in which the charge/discharge cycles have been performed at the charge voltage higher than the upper limit voltage of 4.2V, the cycle characteristics deteriorate remarkably, at high temperatures in particular.

It is, therefore, desirable to provide a lithium ion secondary battery having good cycle characteristics at high temperatures in particular in the case where the charge/discharge cycles have been performed at the charge voltage within a range from 4.25V or more to 6.00V or less.

In a lithium ion secondary battery which has a positive electrode having at least a cathode active material and a binder, a negative electrode, and an electrolyte and a separator which are arranged between the positive electrode and the negative electrode and in which an open circuit voltage per unit cell upon full charging lies within a range from 4.25V or more to 6.00V or less, good cycle characteristics at high temperatures are obtained, in particular, by using the binder containing a polyacrylonitrile resin.

According to an embodiment, there is provided a lithium ion secondary battery which has a positive electrode having at least a cathode active material and a binder, a negative electrode, an electrolyte, and a separator which is arranged between the positive electrode and the negative electrode and in which an open circuit voltage per unit cell in a fully charged state lies within a range from 4.25V or more to 6.00V or less, wherein the cathode active material contains either a lithium-cobalt composite oxide expressed by a general formula: $Li_aCo_{1-x}Me_xO_{2-b}$ in which Me denotes metal elements of at least one kind or two or more kinds selected from vanadium V, copper Cu, zirconium Zr, zinc Zn, magnesium Mg, aluminum Al, and iron Fe; a is set to a value of $0.9 \leq a \leq 1.1$; x is set to a value of $0 \leq x \leq 0.3$; and b is set to a value of $-0.1 \leq b \leq 0.1$, or a lithium-cobalt-nickel-manganese oxide expressed by a general formula: $Li_aNi_{1-x-y-z}Co_xMn_yMe_zO_{2-b}$ in which Me denotes metal elements of at least one kind or two or more kinds selected from vanadium Fe, copper Cu, zirconium Zr, zinc Zn, magnesium Mg, aluminum Al, and iron Fe; a is set to a value of $0.9 \leq a \leq 1.1$; x is set to a value of $0 < x < 0.4$; y is set to a value of $0 < y < 0.4$; z is set to a value of $0 < z < 0.3$; and b is set to a value of $-0.1 \leq b \leq 0.1$, and the binder contains a polyacrylonitrile resin.

According to an embodiment, there is provided a positive electrode having at least a cathode active material and a binder, wherein the cathode active material contains either a lithium-cobalt composite oxide expressed by a general formula: $Li_aCo_{1-x}Me_xO_{2-b}$ in which Me denotes metal elements of at least one kind or two or more kinds selected from vanadium V, copper Cu, zirconium Zr, zinc Zn, magnesium Mg, aluminum Al, and iron Fe; a is set to a value of $0.9 \leq a \leq 1.1$; x is set to a value of $0 \leq x \leq 0.3$; and b is set to a value of $-0.1 \leq b \leq 0.1$, or a lithium-cobalt-nickel-manganese oxide expressed by a general formula: $Li_aNi_{1-x-y-z}Co_xMn_yMe_zO_{2-b}$, in which Me denotes metal elements of at least one kind or two or more kinds selected from vanadium V, copper Cu, zirconium Zr, zinc Zn, magnesium Mg, aluminum Al, and iron Fe; a is set to a value of $0.9 \leq a \leq 1.1$; x is set to a value of $0 < x < 0.4$; y is set to a value of $0 < y < 0.4$; z is set to a value of $0 < z < 0.3$; and b is set to a value of $-0.1 \leq b \leq 0.1$, and the binder contains a polyacrylonitrile resin.

According to the embodiment, by using a binder containing the polyacrylonitrile resin, the deterioration of the adhesion of the positive electrode mixture in the high oxidation atmosphere due to the increase in upper limit voltage upon charging can be alleviated. Thus, in the lithium ion secondary battery in which the open circuit voltage per unit cell in the full charging state lies within a range from 4.25V or more to 6.00V or less, good cycle characteristics can be obtained at high temperatures, in particular.

According to the embodiment, in the lithium ion secondary battery in which the open circuit voltage per unit cell upon full charging lies within the range from 4.25V or more to 6.00V or less, good cycle characteristics can be obtained at high temperatures, in particular.

Other features and advantages will be apparent from the following description taken in conjunction with the accompanying drawings, in which like reference characters designate the same or similar parts throughout the figures thereof.

Additional features and advantages are described herein, and will be apparent from, the following Detailed Description and the figures.

DETAILED DESCRIPTION (1) First Embodiment (1-1) Construction of Lithium Ion Secondary Battery An embodiment is described hereinbelow with reference to the drawings. In the first embodiment, in a lithium ion secondary battery which has a positive electrode, a negative electrode, and a non-aqueous electrolyte and in which an open circuit voltage per unit cell in a full charging state lies within a range from 4.25V or more to 6.00V or less, a cathode active material layer has a binder containing a polyacrylonitrile resin.

The full charging state denotes a final state when the battery is charged by a current value of 0.5 C or less or by a constant current—constant voltage system (a voltage of a constant voltage unit is cut by a current value of 0.1 C or less). C denotes a {charge current value (mA)}/{battery capacitance or electrode capacitance (mA)}. A charge potential of the positive electrode in the full charging state can be measured by, for example, a method whereby a hole through which an electrolytic solution can go in and out is formed in the battery, this battery is dipped into a test cell in which the electrolytic solution has been injected, and lithium is used as a reference electrode.

For example, in the case where a carbon material in which a charge potential of the negative electrode in the full charging state is equal to 0.1V (vs.Li/Li+) is used as an anode active material, the lithium ion secondary battery according to the first embodiment of the invention is charged by a charge final voltage of 4.35V or more.

Figure 1:
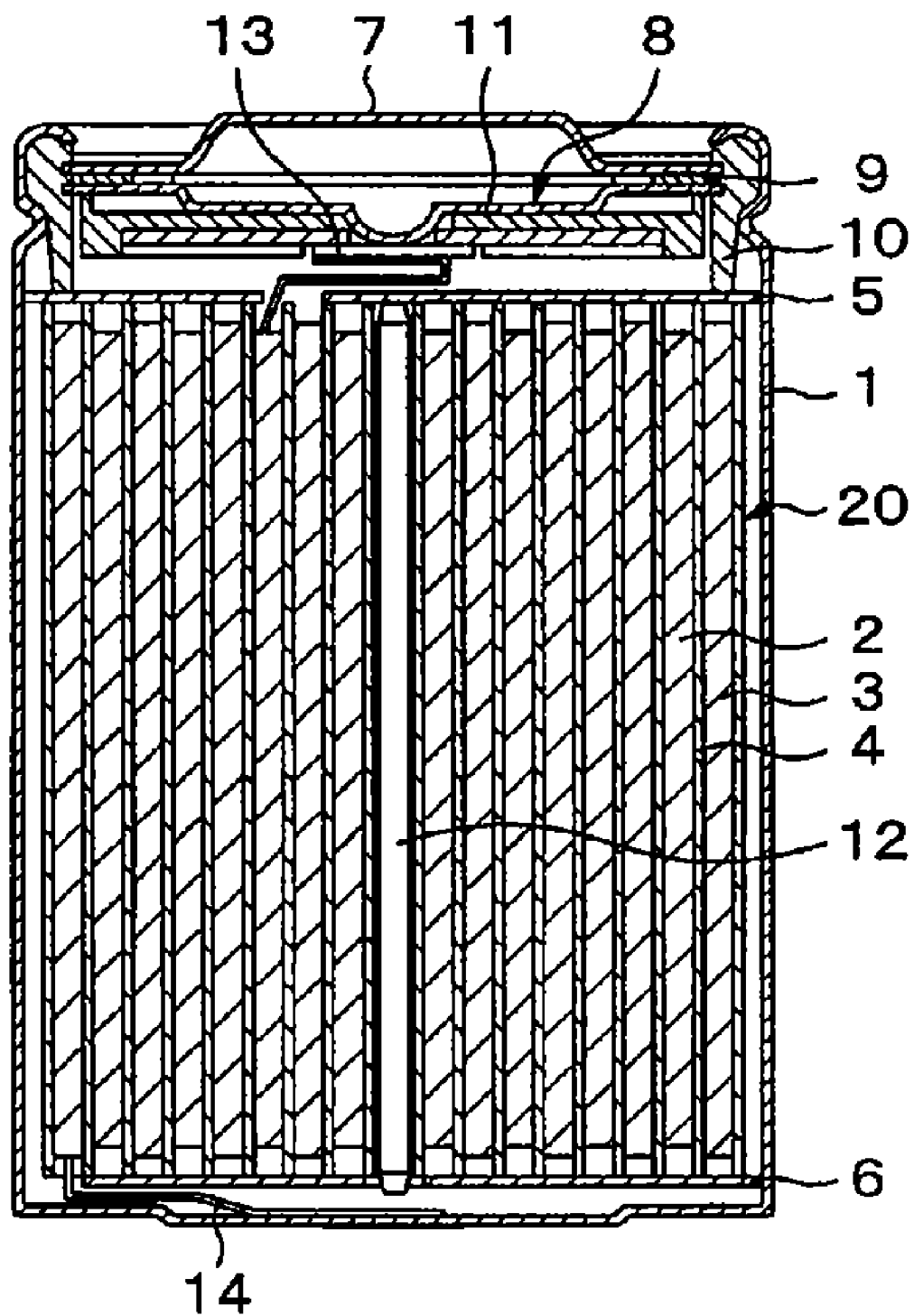
FIG. 1 is a schematic cross sectional view of a lithium ion secondary battery according to the first embodiment.

FIG. 1 shows a cross sectional structure of the lithium ion secondary battery according to the first embodiment. This battery is what is called a cylindrical type and a winded electrode member 20 around which a belt-shaped positive electrode 2 and a belt-shaped negative electrode 3 have been wound through a separator 4 is provided in an almost hollow cylindrical battery can 1.

The battery can 1 is made of, for example, iron (Fe) plated with nickel (Ni), one end portion is closed, and the other end portion is opened. A pair of insulating plates 5 and 6 are arranged in the battery can 1 perpendicularly to the winding peripheral surface so as to sandwich the winded electrode member 20, respectively.

A battery cap 7 and a relief valve mechanism 8 and a thermally-sensitive resistive element (PTC element: Positive Temperature Coefficient element) 9 provided in the battery cap 7 are caulked through a gasket 10 and attached to the open end portion of the battery can 1. The inside of the battery can 1 is sealed. The battery cap 7 is made of, for example, a material similar to that of the battery can 1. The relief valve mechanism 8 is electrically connected to the battery cap 7 through the PTC element 9. When an inner pressure of the battery rises to a predetermined value or more due to an inner short-circuit, heating from the outside, or the like, a disk plate 11 is turned round, thereby disconnecting the electrical connection between the battery cap 7 and the winded electrode member 20. When a temperature rises, a current is limited due to an increase in resistance value of the PTC element 9 and abnormal heat generation by the large current is prevented. The gasket 10 is made of, for example, an insulating material and its surface is coated with asphalt.

The winded electrode member 20 is wound around, for example, a center pin 12 as a center. A positive electrode lead 13 made of aluminum or the like is connected to the positive electrode 2 of the winded electrode member 20. A negative electrode lead 14 made of nickel or the like is connected to the negative electrode 3. The positive electrode lead 13 is welded to the relief valve mechanism 8, so that it is electrically connected to the battery cap 7. The negative electrode lead 14 is welded and electrically connected to the battery can 1.

Figure 2:
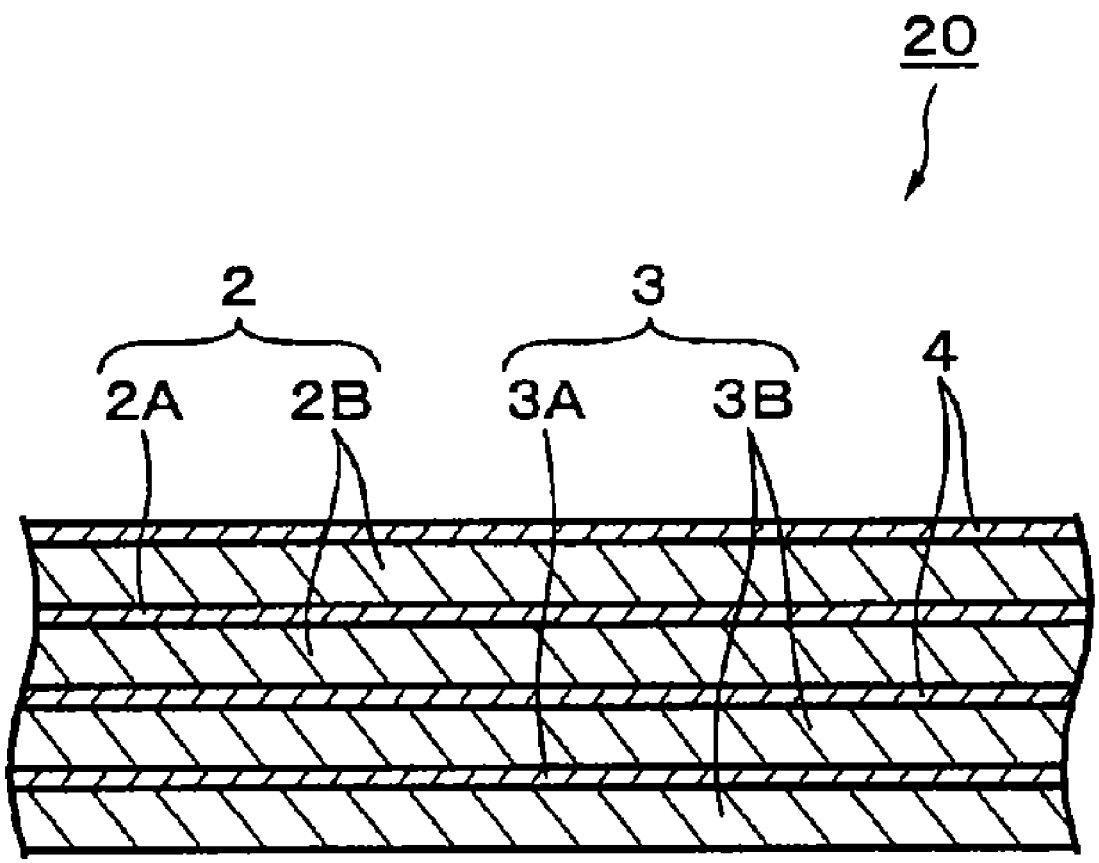
FIG. 2 is a partially enlarged cross sectional view of a winded electrode member shown in FIG. 1.

FIG. 2 partially enlargedly shows the winded electrode member 20 shown in FIG. 1. As shown in FIG. 2, the positive electrode 2 has a structure in which, for example, cathode active material layers 2B are provided for both surfaces of a belt-shaped positive electrode collector 2A. The negative electrode 3 has a structure in which anode active material layers 3B are provided for both surfaces of a belt-shaped negative electrode collector 3A. The positive electrode 2 and the negative electrode 3 face through the separator 4.

[Positive Electrode]

The positive electrode 2 can be obtained by a method whereby the surface of the collector 3A is coated with a positive electrode mixture obtained by mixing a cathode active material, a conductive material, a binder, and the like. Specifically speaking, the positive electrode 2 can be manufactured by the following method. For example, the positive electrode collector 2A made of an aluminum foil or the like is coated with a positive electrode mixture slurry consisting of the powdery cathode active material, the conductive material, the binder, and a solvent or a dispersion medium of the binder, the positive electrode mixture slurry is dried and rolled with a pressure, and the cathode active material layers 2B are formed onto both surfaces of the positive electrode collector 2A.

[Cathode Active Material]

A compound containing lithium can be used as a cathode active material. As a compound containing lithium, for example, a lithium oxide, a lithium sulfide, or an interlayer compound containing lithium is properly used, or two or more kinds of them may be mixed and used. For example, as a cathode active material, it is preferable to contain a lithium composite oxide expressed by a general formula:

$$Li_pNi_{(1-q-r)}Mn_qMl_rO_{(2-y)}X_z$$

(in the formula, Ml denotes at least one kind of elements selected from 2-group to 15-group excluding nickel (Ni) and manganese (Mn); X denotes at least one kind of elements selected from 16-group elements and 17-group elements except oxygen (O); p is set to a value within a range of $0 \leq p \leq 1.5$; q is set to a value within a range of $0 \leq q \leq 1.0$; r is set to a value within a range of $0 \leq r \leq 1.0$; y is set to a value within a range of $-0.10 \leq y \leq 0.20$; and z is set to a value within a range of $0 \leq z \leq 0.2$).

Specifically speaking, for example, the following oxides can be mentioned as a lithium composite oxide.

(Formula 1)

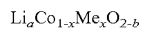

$$Li_aCo_{1-x}Me_xO_{2-b}$$

(Formula 2)

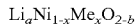

$$Li_aNi_{1-x}Me_xO_{2-b}$$

(Formula 3)

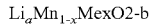

$$Li_aMn_{1-x}Me_xO_{2-b}$$

(In Formula 1 to Formula 3, Me denotes metal elements of at least one kind or two or more kinds selected from V (vanadium), Cu (copper), Zr (zirconium), Zn (zinc), Mg (magnesium), Al (aluminum), and Fe (iron); a is set to a value of $0.9 \leq a \leq 1.1$; x is set to a value of $0 \leq x \leq 0.3$; and b is set to a value of $-0.1 \leq b \leq 0.1$).

(Formula 4)

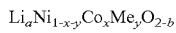

$$Li_aNi_{1-x-y}Co_xMe_yO_{2-b}$$

(Formula 5)

$$Li_aNi_{1-x-y}Mn_xMe_yO_{2-b}$$

(Formula 6)

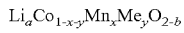

$$Li_aCo_{1-x-y}Mn_xMe_yO_{2-b}$$

(In Formula 4 to Formula 6, Me denotes metal elements of at least one kind or two or more kinds selected from V (vanadium), Cu (copper), Zr (zirconium), Zn (zinc), Mg (magnesium), Al (aluminum), and Fe (iron); a is set to a value of $0.9 \leq a \leq 1.1$; x is set to a value of $0 \leq x \leq 0.05$; y is set to a value of $0 \leq y \leq 0.05$; and b is set to a value of $-0.1 \leq b \leq 0.1$).

(Formula 7)

$$Li_aNi_{1-x-y-z}Co_xMn_yMe_zO_{2-b}$$

(In Formula 7, Me denotes metal elements of at least one kind or two or more kinds selected from V (vanadium), Cu (copper), Zr (zirconium), Zn (zinc), Mg (magnesium), Al (aluminum), and Fe (iron); a is set to a value of $0.9 \leq a \leq 1.1$; x is set to a value of $0 < x < 0.4$; y is set to a value of $0 < y < 0.4$; z is set to a value of $0 < z < 0.3$; and b is set to a value of $-0.1 \leq b \leq 0.1$).

Among the above lithium composite oxides, the lithium-cobalt composite oxide expressed by Formula 1 and the lithium-cobalt-nickel-manganese composite oxide expressed by Formula 7 are preferable.

The lithium-cobalt composite oxide expressed by Formula 1 has an R-3m rhombohedral structure. In order to improve charge/discharge cycle durability and discharge characteristics, it is also possible to construct in such a manner that a metal such as calcium (Ca), magnesium (Mg), titanium (Ti), tantalum (Ta), niobium (Nb), zirconium (Zr), hafnium (Hf), aluminum (Al), or the like is added to the lithium-cobalt composite oxide by an amount of 0.001 to 5% (as an atomic ratio) of cobalt (Co), thereby producing, for example, a lithium-cobalt-aluminum composite oxide or a lithium-cobalt-aluminum-magnesium composite oxide.

It is preferable that the lithium-cobalt-nickel-manganese composite oxide expressed by Formula 7 has the R-3m rhombohedral structure. In Formula 7, if (1-x-y-z) is less than 0.20, since it is difficult to obtain the stable R-3m rhombohedral structure, it is unpreferable. In Formula 7, if (1-x-y-z) exceeds 0.60, since the safety deteriorates, it is also unpreferable. In Formula 7, more preferably, a value of 0.25 to 0.55 is used as y. In Formula 7, a value within a range of $0.9 \leq a \leq 1.2$ is used for capacitance appearance.

The charge/discharge cycle durability, safety, capacitance, and the like can be improved by further adding atoms of one of Fe, Cr, and Al to the lithium-nickel-cobalt-manganese composite oxide expressed by Formula 7. An addition amount z of the Me atoms is set to a value within a range of 0 to 0.2, preferably, 0.01 to 0.18, and more preferably, 0.05 to 0.16.

Further, as a cathode active material, it is preferable to use a mixture of the lithium-cobalt composite oxide expressed by Formula 1 and the lithium-cobalt-nickel-manganese composite oxide expressed by Formula 7. This is because since the cathode active material can be used up to a higher charge area and higher filling performance is obtained, there is such a tendency that the large discharge capacitance per unit volume is obtained. This is also because battery performance in which a balance of the capacitance and the safety has been improved as compared with the case of using the sole lithium transition metal composite oxide used for the mixing process can appear. Further, this is because it is possible to obtain the battery performance which is excellent in terms of the capacitance, safety, and charge/discharge cycle stability as compared with those in the case of using the cathode active material which is made of the sole lithium transition metal composite oxide and whose amount is equal to a content amount of the transition metal elements used for the mixing process.

A cause in which the mixture of the lithium-cobalt composite oxide expressed by Formula 1 and the lithium-cobalt-nickel-manganese composite oxide expressed by Formula 7 is superior to the sole substance is obscure. However, in the lithium-nickel-cobalt-manganese composite oxide expressed by Formula 7, since its safety is remarkably high and an apparent degree of the capacitance is relatively good, it is considered as such a reason that a synergy appears by the mixing process.

As for mixture powder of the lithium-cobalt composite oxide expressed by Formula 1 and the lithium-cobalt-nickel-manganese composite oxide expressed by Formula 7, it is preferable that a powder press density when only the powder has been filled at a pressure of 1 t/cm$^2$ is equal 3.0 g/cm$^3$ or more and, more preferably, 3.20 g/cm$^3$. By using such a mixture, when the mixture is used as a slurry. The aluminum foil as a collector is coated with such a mixture slurry, the mixture slurry is dried and pressed, and the capacitance per volume can be increased.

Such a powder press density of 3.0 g/cm$^3$ or more is accomplished by optimizing particle size distribution of the mixture powder. That is, since the particle size distribution has a width and a volume fraction of a small grain diameter lies within a range from 20 to 50%, the high powder press density can be accomplished by narrowing the particle size distribution of a large grain diameter, or the like.

It is preferable to set a BET specific surface area of the cathode active material to a value within a range from 0.05 to 10.0 m$^2$/g, more preferably, 0.1 to 5.0 m$^2$/g. By setting the BET specific surface area to such a range, reactivity of the cathode active material and an electrolytic solution at a high electric potential can be suppressed.

As a manufacturing method of the lithium composite oxide, a well-known manufacturing method can be used. Specifically speaking, for example, it is possible to use a method whereby a lithium compound and a metal compound are mixed and heated, thereby obtaining such a lithium composite oxide, a wet method whereby a lithium compound and a metal compound are reacted in a solution, thereby obtaining such a lithium composite oxide, or the like.

[Conductive Material]

As a conductive material, a carbon conductive material such as acetylene black, graphite, ketjen black, or the like can be used.

[Binder]

As a binder, a material containing a polyacrylonitrile resin can be used. As a polyacrylonitrile resin, a material obtained by copolymerizing the following material to a compound having a nitrile radical such as poly (metha) acrylonitrile or the like: for example, alkyl (metha) acrylate such as methyl (metha) acrylate, ethyl (metha) acrylate, butyl (metha) acrylate, isobutyl (metha) acrylate, 2-ethylhexyl (metha) acrylate, lauryl (metha) acrylate, cyclohexyl (metha) acrylate, or the like; hydroxyalkyl (metha) acrylate such as cycloalkyl (metha) acrylate, 2-hydroxylethyl (metha) acrylate, 2-hydroxypropyl (metha) acrylate, or the like; aminoalkyl (metha) acrylate such as aminomethyl (metha) acrylate, N-methylaminomethyl (metha) acrylate, N,N-diethylaminoethyl (metha) acrylate, or the like; styrene monomer such as methacrylic acid, acrylic acid, styrenevinyl toluene, α-methylstyrene, or the like; vinyl derivative such as vinyl chloride, vinylidene chloride, vinyl acetate, isopropenyl acetate, or the like; unsaturated dibasic acid such as maleic acid, fumaric acid, or the like; or the like. The above materials are used solely or a combination of two or more kinds of them is used.

As a binder, it is desirable to contain a compound having an ester linkage expressed by the following Expression (I). As a monomer expressed by Expression (I), although it is not particularly limited, it is preferable that $R_1$ is H or $CH_3$. It is preferable that $R_2$ is a hydrocarbon radical of two values. As a hydrocarbon radical of two values, for example, an alkylene radical whose number of carbons lies within a range from 4 to 100, an alkylene radical whose number of carbons lies within a range from 6 to 50, or an alkylene radical whose number of carbons lies within a range from 8 to 15 is proper. This alkylene radical may be a linear chain or a branch chain. A part of the alkylene radical may be replaced by halogen of fluorine, chlorine, bromine, iodine, or the like, nitrogen, phosphorus, aromatic ring, cycloalkane whose number of carbons lies within a range from 3 to 10, or the like. In Expression (I), it is proper that $R_2$ is one alkylene radical whose number of carbons lies within a range from 2 to 6, preferably, an alkylene radical whose number of carbons lies within a range from 2 to 4. $R_2$ may be a radical in which 2 to 20, preferably, 2 to 10, more preferably, 2 to 5 alkylene radicals in each of which the number of carbons lies within a range from 2 to 6 have been coupled by an ether linkage and/or an ester linkage. The alkylene radical may be replaced by halogen of fluorine, chlorine, bromine, iodine, or the like, nitrogen, phosphorus, aromatic ring, cycloalkane whose number of carbons lies within a range from 3 to 10, or the like. Specifically speaking, triethylene glycol monoacrylate such as monoethylene glycol monomethacrylate, or the like can be mentioned.

[Formula 1]

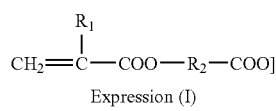

Expression (I)

As a polyacrylonitrile resin, it is preferable to use a resin in which a functional radical of at least one kind selected from a alcoholic hydroxyl radical, a carboxyl radical, and a nitrile radical is provided in the molecule.

Further, a polyacrylonitrile resin containing a carboxyl radical is preferable as a binder. A mixture of a polyacrylonitrile resin containing a carboxyl radical and a vinylidene fluoride polymer is more preferable.

As a ratio of the polyacrylonitrile copolymer resin having the carboxyl radical and the vinylidene fluoride polymer, (the vinylidene fluoride polymer: the polyacrylonitrile copolymer resin having the carboxyl radical)=(1:99) to (99:1) is preferable as a volume ratio, and (the vinylidene fluoride polymer: the polyacrylonitrile copolymer resin having the carboxyl radical)=(20:80) to (80:20) is more preferable.

A homopolymer of vinylidene fluoride, a copolymer of vinylidene fluoride, and their modified polymer are contained in the vinylidene fluoride polymer. As a vinylidene fluoride polymer, a polymer whose intrinsic viscosity lies within a range from 1.7 to 20 dl/g is preferable, and 2.0 to 15 dl/g is more preferable.

A ratio of the binder in the positive electrode mixture lies within a range from 1 to 7 mass %, preferably, 2 to 5 mass %. If it is equal to 1 mass % or less, it is difficult to hold binding performance and there is a risk that it is difficult to fix the active material to the collector. If such a ratio is equal to 7 mass % or more, the binder which does not have the electron conductivity and ion conductivity covers the cathode active material and there is a risk that it is difficult to perform the rapid charge/discharge.

[Negative Electrode]

The negative electrode 3 can be obtained by a method whereby the surface of the negative electrode collector 3A is coated with a negative electrode mixture obtained by mixing an anode active material, a conductive material, a binder, and the like and the anode active material layer 3B is provided.

[Anode Active Material]

As an anode active material, for example, a carbon material, a metal compound, an oxide, a sulfide, a lithium nitride such as $LiN_3$ or the like, a lithium metal, a metal forming an alloy together with lithium, a high molecular material, or the like can be used.

As a carbon material, for example, graphitization-retardant carbon, graphitization-easy carbon, graphite, a pyrolytic carbon class, a coke class, a glassy carbon class, an organic high molecular compound baked material, carbon fiber, or activated charcoal can be used. Among them, there is a pitch coke, a needle coke, a petroleum coke, or the like as a coke. The organic high molecular compound baked material denotes a material obtained by baking a high molecular material such as phenol resin, fran resin, or the like at a proper temperature and carbonating it. A part of those materials are classified into graphitization-retardant carbon or graphitization-easy carbon.

Polyacetylene, polypyrrole, or the like can be mentioned as a high molecular material. Among such negative electrode materials which can dope/dedope such lithium, a material whose charge/discharge potential is relatively close to that of lithium metal is preferable. This is because the lower the charge/discharge potential of the negative electrode is, the easier the high-energy density of the battery can be realized. Among them, the carbon material is preferable from viewpoints that a change in crystal structure occurring upon charging/discharging is very small, a high charge/discharge capacitance can be obtained, and the good cycle characteristics can be obtained. Particularly, graphite is preferable from viewpoints that an electrochemical equivalent is large and a high energy density can be obtained. Further, graphitization-retardant carbon is preferable from a viewpoint that the excellent cycle characteristics can be obtained.

As a negative electrode material which can dope/dedope lithium, a lithium metal simple substance or a simple substance, an alloy, or a compound of metal elements or semimetal elements which can form an alloy together with lithium can be used. They are preferable because the high energy density can be obtained. Particularly, if such a material is used together with the carbon material, it is more preferable because the high energy density can be obtained and the excellent cycle characteristics can be also obtained.

In the specification, among alloys, in addition to an alloy consisting of two or more kinds of metal elements, an alloy consisting of one or more kinds of metal elements and one or more kinds of semimetal elements is also included. As its texture, there is a solid solution, an eutectic (eutectic mixture), an intermetallic compound, or a texture in which two or more kinds coexist.

As such a metal element or semimetal element, tin (Sn), lead (Pb), aluminum, indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y), or hafnium (Hf) can be mentioned.

As an alloy or compound of them, for example, a material expressed by a chemical formula $Ma_sMb_tLi_u$ or a chemical formula $Ma_pMc_gMd_r$ can be mentioned. In those chemical formulae, Ma denotes at least one kind of metal elements and semimetal elements which can form an alloy together with lithium, Mb denotes at least one kind of metal elements and semimetal elements other than lithium and Ma, Mc denotes at least one kind of non-metal elements, and Md denotes at least one kind of metal elements and semimetal elements other than Ma. Values of s, t, u, p, q, and r are set to $s>0$, $t\geq 0$, $u\geq 0$, $p>0$, $q>0$, and $r\geq 0$, respectively.

Among them, a simple substance, an alloy, or a compound of metal elements or semimetal elements of the 4B group in the short period type periodic table is preferable. Silicon, tin, or an alloy or a compound of them is particularly preferable. They may be crystalline or amorphous.

[Conductive Material]

The conductive material for the negative electrode is not particularly limited so long as it is an electron conductive material. For example, the following materials can be mentioned: a graphite class such as artificial graphite, expanded graphite, or the like; a carbon black class such as acetylene black, ketjen black, channel black, furnace black, or the like; a conductive fiber class such as carbon fiber, metal fiber, or the like; a metal powder class such as copper, nickel, or the like; an organic conductive material such as a polyphenylene derivative or the like; and the like. Those materials can be used solely or as a mixture. Among those conductive materials, acetylene black, ketjen black, and carbon fiber are particularly preferable. Although an addition amount of the conductive material is not limited in particular, 0.1 to 30 mass parts are preferable for the anode active material of 100 mass parts, and further, 5 to 10 mass parts are more preferable.

[Binder]

As a binder for the negative electrode, for example, it is preferable to use polytetrafluoro ethylene, polyvinylidene fluoride, or the like.

The negative electrode collector 3A is not limited in particular so long as it is an electron conductor which does not cause a chemical reaction in the constructed battery. As such a material, for example, stainless steel, nickel, copper, titanium, or the like can be mentioned. As such a material, copper is preferable. Although its thickness is not limited in particular, it preferably lies within a range from 1 to 100 μm, more preferably, 5 to 30 μm.

[Electrolytic Solution]

As an electrolytic solution, a non-aqueous electrolytic solution obtained by dissolving an electrolytic salt into a non-aqueous solvent can be used. As a non-aqueous solvent, for example, it is preferable to contain at least either ethylene carbonate or propylene carbonate from a viewpoint that the cycle characteristics can be improved. For example, it is preferable that ethylene carbonate and propylene carbonate are mixed and contained from a viewpoint that the cycle characteristics can be further improved.

Further, as a non-aqueous solvent, it is preferable to contain at least one kind selected from chain-like carbonic esters such as diethyl carbonate, dimethyl carbonate, ethylmethyl carbonate, and methylpropyl carbonate, and the like from a viewpoint that the cycle characteristics can be further improved.

Further, as a non-aqueous solvent, it is preferable to contain at least either 2,4-difluoroanisole or vinylene carbonate. This is because the discharge capacitance can be improved in the case of 2,4-difluoroanisole. This is because the cycle characteristics can be further improved in the case of vinylene carbonate. Particularly, if they are mixed and contained, it is more preferable because both of the discharge capacitance and the cycle characteristics can be improved.

Moreover, as a non-aqueous solvent, it is also possible to contain one kind or two or more kinds selected from butylene carbonate, γ-butyrolactone, γ-valerolactone, a material in which a part or all of a hydrogen radical of a compound of them is replaced by a fluorine radical, 1,2-dimethoxy ethane, tetrahydrofuran, 2-methyl tetrahydrofuran, 1,3-dioxorane, 4-methyl-1,3-dioxorane, methyl acetate, methyl propionate, acetonitrile, glutaronitrile, adiponitrile, methoxy acetonitrile, 3-methoxy propylonitrile, N,N-dimethyl formamide, N-methylpyrrolidinone, N-methyl oxazolidinone, N,N-dimethyl imidazolidinone, nitromethane, nitroethane, sulfolan, dimethyl sulfoxide, trimethyl phosphate, and the like.

Further, in dependence on the electrode which is combined, there is a case where the reversibility of the electrode reaction is improved by using a material in which a part or all of the hydrogen atoms of the substance contained in the group of non-aqueous solvents mentioned above has been replaced by fluorine atoms. Therefore, those substances can be also properly used as a non-aqueous solvent.

As a lithium salt as an electrolyte, for example, $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, or LiBr can be used. One kind or two or more kinds of them can be mixed and used.

Among them, as a lithium salt, it is preferable to use $LiPF_6$ from viewpoints that the high ion conductivity can be obtained and the cycle characteristics can be improved. Further, in the case of charging the battery at the high charge voltage, for example, although aluminum as a positive electrode collector can be easily dissolved, under the existence of $LiPF_6$, since $LiPF_6$ is resolved, a coating film can be formed onto the aluminum surface. Thus, the dissolution of aluminum can be suppressed.

[Separator]

As a separator 4, an insulative microporous membrane having large ion permeability and predetermined mechanical strength can be used. A separator having a function of closing holes at a predetermined temperature or higher and increasing a resistance is preferable. Specifically speaking, for example, it is possible to use a sheet made of glass fiber or olefin polymer such as polypropylene, polyethylene, or the like having organic solvent resistance and hydrophobic, an non-woven fabric cloth, or a woven fabric cloth can be used.

In the first embodiment, an open circuit voltage upon full charging is equal to 4.25V or more. From this point, it is preferable that the surface of the separator 4 which is come into contact with the electrode is polypropylene. Specifically speaking, a separator with a triple-layer structure in which polypropylene, polyethylene, and polypropylene have sequentially been laminated can be used as a separator 4. For example, if the separator 4 which is come into contact with the electrode is a mixture of polyethylene and polypropylene, it is preferable that a ratio of polypropylene is larger than that of polyethylene.

Further, it is preferable that a hole diameter of the separator 4 lies within a range where the cathode active material, anode active material, conductive material, binder, and the like which desorbed from the positive electrode 2 or the negative electrode 3 do not pass through. Specifically speaking, it is preferable that the hole diameter of the separator 4 lies within a range, for example, from 0.01 to 1 μm.

Further, a thickness of separator 4 preferably lies within a range from 10 to 300 μm, more preferably, 15 to 30 μm. Further, a porosity of the separator 4 is determined in accordance with electron permeability, ion permeability, raw materials, and film thickness. Preferably, the porosity of the separator 4 lies within a range from 30 to 80%, more preferably, 35 to 50%.

(1-2) Manufacturing Method of Lithium Ion Secondary Battery

A manufacturing method of the lithium ion secondary battery according to the first embodiment is described below. The manufacturing method of the lithium ion secondary battery is described below with respect to a cylindrical lithium ion secondary battery as an example.

The positive electrode 2 is manufactured as follows. First, for example, the cathode active material, conductive material, and binder are mixed and the positive electrode mixture is adjusted and formed. This positive electrode mixture is dispersed into the solvent of, for example, 1-methyl-2-pyrolidone or the like, thereby forming the positive electrode mixture slurry.

Subsequently, the positive electrode collector 2A having the conductive layer is coated with the positive electrode mixture slurry, the solvent is dried, thereafter, the obtained collector is compression-molded by a roll pressing machine or the like, the cathode active material layer 2B is formed, and the positive electrode 2 is manufactured.

The negative electrode 3 is manufactured as follows. First, for example, the anode active material and binder are mixed and the negative electrode mixture is adjusted and formed. This negative electrode mixture is dispersed into the solvent of, for example, 1-methyl-2-pyrolidone or the like, thereby forming the negative electrode mixture slurry. Subsequently, the negative electrode collector 3A is coated with the negative electrode mixture slurry, the solvent is dried, thereafter, the obtained collector is compression-molded by the roll pressing machine or the like, the anode active material layer 3B is formed, and the negative electrode 3 is manufactured.

Subsequently, the positive electrode lead 13 is attached to the positive electrode collector 2A by, for example, welding and the negative electrode lead 14 is attached to the negative electrode collector 3A by, for example, welding. The positive electrode 2 and the negative electrode 3 are wound through the separator 4, a front end portion of the positive electrode lead 13 is welded to the relief valve mechanism 8, a front end portion of the negative electrode lead 14 is welded to the battery can 1, and the wound positive electrode 2 and negative electrode 3 are sandwiched by a pair of insulating plates 5 and 6 and enclosed in the battery can 1.

Subsequently, the electrolytic solution is injected into the battery can 1 and dipped into the separator 4. The battery cap 7, relief valve mechanism 8, and PTC element 9 are caulked and fixed to the open end portion of the battery can 1 through the gasket 10. Thus, the lithium ion secondary battery according to the first embodiment is manufactured in this manner.

According to the first embodiment, in the lithium ion secondary battery which executes the charge/discharge cycle at a high charge voltage in a range from 4.25V or more to 6.00V or less, by using a binder containing a polyacrylonitrile resin as a binder, the good cycle characteristics can be obtained. Particularly, the deterioration of the cycle characteristics which occurs remarkably at a temperature higher than the room temperature can be suppressed.

(2) Second Embodiment (2-1) Construction of Lithium Ion Secondary Battery

Figure 3:
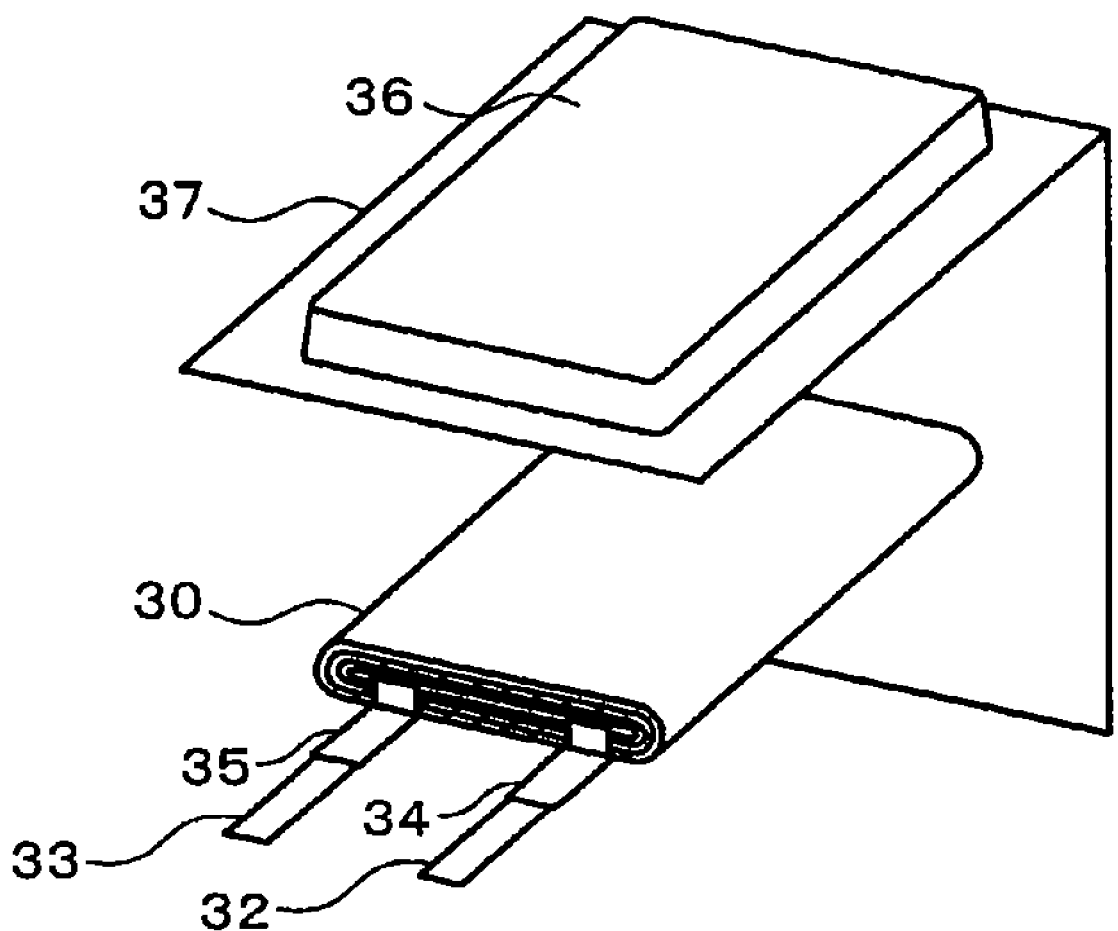
FIG. 3 is a schematic diagram showing a structure of a lithium ion secondary battery according to the second embodiment.

FIG. 3 shows a structure of a lithium ion secondary battery according to the second embodiment. As shown in FIG. 3, this lithium ion secondary battery is constructed by a method whereby a battery element 30 is enclosed into a sheathing member 37 made of a moisture-proof laminate film and the circumference of the battery element 30 is welded so as to be sealed. A positive electrode lead 32 and a negative electrode lead 33 are provided for the battery element 30. Those leads are sandwiched by the sheathing member 37 and led out to the outside. Both surfaces of each of the positive electrode lead 32 and the negative electrode lead 33 are covered with resin members 34 and 35 in order to improve adhesion with the sheathing member 37.

[Sheathing Member]

The sheathing member 37 has a laminate structure in which, for example, an adhesive layer, a metal layer, and a surface protecting layer have sequentially been laminated. The adhesive layer is made of a high molecular film. As a material constructing the high molecular film, for example, polypropylene (PP), polyethylene (PE), casted polypropylene (non-oriented polypropylene) (CPP), linear low-density polyethylene (LLDPE), or a low-density polyethylene (LDPE) can be mentioned. The metal layer is made of a metal foil. As a material constructing the metal foil, for example, aluminum (Al) can be mentioned. As a material constructing the metal foil, metal other than aluminum can be also used. As a material constructing the surface protecting layer, for example, nylon (Ny) or polyethylene terephthalate (PET) can be mentioned. The surface of the adhesive layer becomes an enclosing surface of the side where the battery element 30 is enclosed.

[Battery Element]

Figure 4:
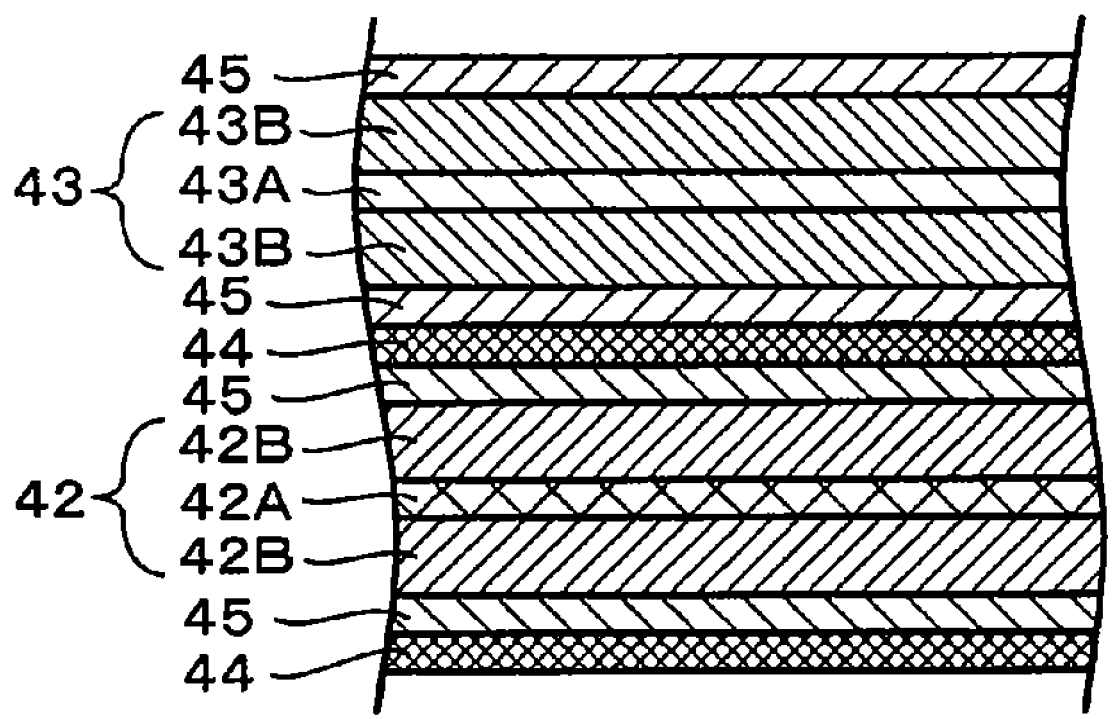
FIG. 4 is a partially enlarged cross sectional view of a battery element shown in FIG. 3.

For example, as shown in FIG. 4, the battery element 30 is a winding type battery element 30 constructed in such a manner that a belt-shaped negative electrode 43 provided with gel electrolyte layers 45 on both sides, a separator 44, a belt-shaped positive electrode 42 provided with the gel electrolyte layers 45 on both sides, and the separator 44 are laminated and wound in the longitudinal direction.

The positive electrode 42 is constructed by a belt-shaped positive electrode collector 42A and cathode active material layers 42B formed on both surfaces of the positive electrode collector 42A. The positive electrode collector 42A is a metal foil made of, for example, aluminum (Al) or the like.

The positive electrode lead 32 connected by, for example, spot welding or ultrasonic welding is provided for one end portion in the longitudinal direction of the positive electrode 42. As a material of the positive electrode lead 32, for example, a metal such as aluminum or the like can be used.

The negative electrode 43 is constructed by a belt-shaped negative electrode collector 43A and anode active material layers 43B formed on both surfaces of the negative electrode collector 43A. The negative electrode collector 43A is constructed by, for example, a metal foil such as copper (Cu) foil, nickel foil, stainless foil, or the like.

The negative electrode lead 33 connected by, for example, the spot welding or ultrasonic welding is also provided for one end portion in the longitudinal direction of the negative electrode 43 in a manner similar to the positive electrode 42. As a material of the negative electrode lead 33, for example, copper (Cu), nickel (Ni), or the like can be used.

Since a construction other than the gel electrolyte layer 45 is similar to that of the foregoing first embodiment, explanation will be made hereinbelow with respect to the gel electrolyte layer 45.

The gel electrolyte layer 45 contains an electrolytic solution and a high molecular compound serving as a holding member to hold the electrolytic solution and is in what is called a gel state. The gel electrolyte layer 45 is preferable because the high ion conductivity can be obtained and a leakage of a solution in the battery can be prevented. A construction of the electrolytic solution is similar to that in the first embodiment. As a high molecular compound, for example, there can be mentioned: polyacrylonitrile; polyvinylidene fluoride; copolymer of vinylidene fluoride and hexafluoro propylene; polytetrafluoro ethylene; polyhexafluoro propylene; polyethylene oxide; polypropylene oxide; polyphosphazene; polysiloxane; polyvinyl acetate; polyvinyl alcohol; polymethyl methacrylate; polyacrylic acid; polymethacrylate; styrene-butadiene rubber; nitrile-butadiene rubber; polystyrene; polycarbonate; or the like. Polyacrylonitrile, polyvinylidene fluoride, polyhexafluoro propylene, or polyethylene oxide is preferable, particularly, from a viewpoint of electrochemical stability.

(2-1) Manufacturing Method of Lithium Ion Secondary Battery

A manufacturing method of the lithium ion secondary battery according to the second embodiment is described below. First, each of the positive electrode 42 and the negative electrode 43 is coated with a presolvent containing a solvent, electrolytic salt, a high molecular compound and a mixed solvent, and the mixed solvent is volatilized, thereby forming the gel electrolyte layer 45. The positive electrode lead 32 is preliminarily attached to an end portion of the positive electrode collector 42A by welding. The negative electrode lead 33 is also preliminarily attached to an end portion of the negative electrode collector 43A by welding.

Subsequently, the positive electrode 42 and negative electrode 43 on each of which the gel electrolyte layer 45 has been formed are laminated through the separator 44, thereby obtaining a laminate. After that, this laminate is wound in its longitudinal direction, thereby forming the winding type battery element 30.

Then, a concave portion 36 is formed by deep-drawing the sheathing member 37 made of a laminate film. The battery element 30 is inserted into the concave portion 36. An unprocessed portion of the sheathing member 37 is folded to an upper portion of the concave portion 36 and an outer peripheral portion of the concave portion 36 is thermally welded, thereby sealing. In this manner, the lithium ion secondary battery according to the second embodiment is manufactured.

EXAMPLES

Examples are shown and described in further detail below. However, the invention is not limited to the following Examples.

TABLE 1

| | Positive electrode | | | | | | | | |
|---|---|---|---|---|---|---|---|---|---|
| | Active material (wt %) | | | Conductive material | Binder resin (wt %) | | | | |
| | Active material 1 | Active materia 2 | Active material 3 | (wt %) KB | PAN resin 1 | PAN resin 2 | PVDF 1 | PVDF 2 | Drying conditions |
| Example 1 | 77.4 | 19.3 | — | 1.3 | 2 | — | — | — | 120° C., 12 hours |
| Example 2 | 76.7 | 19.2 | — | 1.3 | 0.4 | — | 2.4 | — | 120° C., 12 hours |
| Example 3 | 77 | 19.2 | — | 1.3 | 1 | — | 1.5 | — | 120° C., 12 hours |
| Example 4 | 77.2 | 19.3 | — | 1.3 | 1.6 | — | 0.6 | — | 120° C., 12 hours |
| Example 5 | 77 | 19.2 | — | 1.3 | 1 | — | 1.5 | — | 120° C., 12 hours |
| Example 6 | 77.4 | 19.3 | — | 1.3 | 2 | — | — | — | 150° C., 12 hours |
| Example 7 | 77 | 19.2 | — | 1.3 | 1 | — | 1.5 | — | 120° C., 12 hours |
| Example 8 | 77 | 19.2 | — | 1.3 | 1 | — | 1.5 | — | 120° C., 12 hours |
| Example 9 | 77 | 19.2 | — | 1.3 | 1 | — | 1.5 | — | 120° C., 12 hours |
| Example 10 | 48.1 | 48.1 | — | 1.3 | 1 | — | 1.5 | — | 120° C., 12 hours |
| Example 11 | — | 96.2 | — | 1.3 | 1 | — | 1.5 | — | 120° C., 12 hours |
| Example 12 | 77 | 19.2 | — | 1.3 | 1 | — | 1.5 | — | 120° C., 12 hours |
| Example 13 | 77 | 19.2 | — | 1.3 | 1 | — | 1.5 | — | 120° C., 12 hours |
| Example 14 | 77 | 19.2 | — | 1.3 | 1 | — | 1.5 | — | 120° C., 12 hours |
| Example 15 | 77.4 | 19.3 | — | 1.3 | — | 2 | — | — | 120° C., 12 hours |
| Comparison 1 | 76.6 | 19.1 | — | 1.3 | — | — | 3 | — | 120° C., 12 hours |
| Comparison 2 | 76.6 | 19.1 | — | 1.3 | — | — | — | 3 | 120° C., 12 hours |
| Comparison 3 | 77.4 | 19.3 | — | 1.3 | 2 | — | — | — | 120° C., 12 hours |
| Comparison 4 | 76.6 | 19.1 | — | 1.3 | — | — | 3 | — | 120° C., 12 hours |
| Comparison 5 | 76.6 | 19.1 | — | 1.3 | — | — | — | 3 | 120° C., 12 hours |
| Comparison 6 | 76.6 | 19.1 | — | 1.3 | — | — | 3 | — | 120° C., 12 hours |
| Comparison 7 | 76.6 | 19.1 | — | 1.3 | — | — | 3 | — | 120° C., 12 hours |
| Comparison 8 | 76.6 | 19.1 | — | 1.3 | — | — | 3 | — | 120° C., 12 hours |
| Comparison 9 | — | — | 95.7 | 1.3 | — | — | 3 | — | 120° C., 12 hours |
| Comparison 10 | — | — | 96.7 | 1.3 | 2 | — | — | — | 120° C., 12 hours |

TABLE 2

| | Intrinsic viscosity ηi(dl/g) |
|---|---|
| PVDF binder 1 | 1.3 |
| PVDF binder 2 | 3.1 |

TABLE 3

| | Negative electrode |
|---|---|
| Example 1 | Negative electrode 1 |
| Example 2 | Negative electrode 1 |
| Example 3 | Negative electrode 1 |
| Example 4 | Negative electrode 1 |

TABLE 3-continued

| | Negative electrode |
|---|---|
| Example 5 | Negative electrode 1 |
| Example 6 | Negative electrode 1 |
| Example 7 | Negative electrode 1 |
| Example 8 | Negative electrode 1 |
| Example 9 | Negative electrode 1 |
| Example 10 | Negative electrode 1 |
| Example 11 | Negative electrode 1 |
| Example 12 | Negative electrode 1 |
| Example 13 | Negative electrode 2 |
| Example 14 | Negative electrode 3 |
| Example 15 | Negative electrode 1 |
| Comparison 1 | Negative electrode 1 |
| Comparison 2 | Negative electrode 1 |
| Comparison 3 | Negative electrode 1 |
| Comparison 4 | Negative electrode 1 |
| Comparison 5 | Negative electrode 1 |
| Comparison 6 | Negative electrode 1 |
| Comparison 7 | Negative electrode 1 |
| Comparison 8 | Negative electrode 1 |
| Comparison 9 | Negative electrode 1 |
| Comparison 10 | Negative electrode 1 |

TABLE 4

| | Separator |
|---|---|
| Example 1 | Triple-layer separator |
| Example 2 | Triple-layer separator |
| Example 3 | Triple-layer separator |
| Example 4 | Triple-layer separator |
| Example 5 | Triple-layer separator |
| Example 6 | Triple-layer separator |
| Example 7 | Triple-layer separator |
| Example 8 | Triple-layer separator |
| Example 9 | Triple-layer separator |
| Example 10 | Triple-layer separator |
| Example 11 | Triple-layer separator |
| Example 12 | Polyethylene |
| Example 13 | Triple-layer separator |
| Example 14 | Triple-layer separator |
| Example 15 | Triple-layer separator |
| Comparison 1 | Triple-layer separator |
| Comparison 2 | Triple-layer separator |
| Comparison 3 | Triple-layer separator |
| Comparison 4 | Triple-layer separator |
| Comparison 5 | Triple-layer separator |
| Comparison 6 | Triple-layer separator |
| Comparison 7 | Triple-layer separator |
| Comparison 8 | Triple-layer separator |
| Comparison 9 | Triple-layer separator |
| Comparison 10 | Triple-layer separator |

* Triple-layer separator: The surface which is come into contact with the electrode is polypropylene and the inside is polyethylene Table 1 shows compositions of the positive electrodes used in Examples 1 to 15 and Comparisons 1 to 10 and drying conditions when manufacturing the positive electrodes. Table 2 shows intrinsic viscosities of PVDF 1 and PVDF 2. Table 3 shows the negative electrodes used in Examples 1 to 15 and Comparisons 1 to 10. Table 4 shows separators used in Examples 1 to 15 and Comparisons 1 to 10. Examples 1 to 15 and Comparisons 1 to 10 will be described hereinbelow with reference to Tables 1 to 4.

1. Manufacturing of the Positive Electrodes

The manufacturing of the positive electrodes used in Examples 1 to 15 and Comparisons 1 to 10 will be explained with reference to Table 1.

First, explanation will be made with respect to a lithium-cobalt-aluminum-magnesium composite oxide (I) [$LiCo_{0.8}Al_{0.1}Mg_{0.1}O_2$] (hereinbelow, properly referred to as an active material 1), a lithium-nickel-cobalt-manganese composite oxide (II) [$LiNi_{0.5}Co_{0.2}Mn_{0.3}O_4$] (hereinbelow, properly referred to as an active material 2), an active material 3, a PAN (polyacrylonitrile) resin 1, a PAN resin 2, PVDF 1, and PVDF 2 which were used to manufacture the positive electrode.

<Synthesis 1> (synthesis of Active Material 1)

LiOH and a coprecipitation oxide expressed by $Co_{0.98}Al_{0.01}Mg_{0.01}(OH)_2$ are mixed by a mortar so that a mole ratio of (Li: total of the transition metals) is equal to (1:1). This mixture is thermally processed in an air atmosphere at 800° C. for 12 hours and, thereafter, ground, so that the following composite oxides are obtained: a lithium-cobalt composite oxide (A) [$LiCo_{0.8}Al_{0.1}Mg_{0.1}O_2$] in which a BET specific surface area is equal to 0.44 m²/g and an average particle size is equal to 6.2 μm; and a lithium-cobalt-aluminum-magnesium composite oxide (B)[$LiCo_{0.8}Al_{0.1}Mg_{0.1}O_2$] in which a BET specific surface area is equal to 0.20 m²/g and an average particle size is equal to 16.7 μm. The active material 1 is obtained by mixing the composite oxide (A) and the composite oxide (B) at a ratio of (1:1). By analyzing the active material 1 by the X-ray diffraction by CuKα, it has been confirmed that it has an R-3 rhombohedral layered rocksalt structure.

<Synthesis 2> (Synthesis of Active Material 2)

LiOH and a coprecipitation oxide expressed by $Ni_{0.5}Co_{0.2}Mn_{0.3}(OH)_4$ are mixed by the mortar so that a mole ratio of (Li: total of the transition metals) is equal to (1:1). This mixture is thermally processed in the air atmosphere at 1000° C. for 20 hours and, thereafter, ground, so that the active material 2 whose average particle size is equal to 11.5 μm is obtained. The BET specific surface area of the active material 2 is equal to 0.38 m²/g.

<Synthesis 3> (Synthesis of Active Material 3)

As an active material 3, a lithium iron phosphorous oxide (LiFePO4) as a lithium phosphorous oxide is manufactured under the following conditions. Lithium phosphate and iron (II) phosphate (II) ○ octahydrate are mixed so that an element ratio of lithium and iron is equal to (1:1), and ketjen black powder is added to a resultant mixture so that its addition amount is equal to 10% of a whole baked substance which is obtained after the baking, thereby obtaining a mixed sample. The mixed sample is inserted into a vessel made of alumina and milling is executed by using a planetary ball mill under conditions in which a sample/alumina ball weight ratio (%) is equal to 60%, a rotational speed is equal to 300 rpm, and an operating time is equal to 10 hours. After that, baking is executed in a ceramics crucible at 600° C. for 5 hours in an electric furnace in a nitrogen atmosphere, thereby obtaining a baked substance of ($LiFePO_4$) containing a carbon material.

<Synthesis of Binder>

<PAN Resin 1>

A refined water of 1804 g is poured into a separable flask of 3 liters having an agitator, a thermometer, a cooling pipe, and a nitrogen gas introducing pipe. While the refined water is being agitated under a condition in which an aeration amount of the nitrogen gas is equal to 200 ml/min, a temperature is raised to 75° C., and thereafter, the aeration of the nitrogen gas is stopped. Subsequently, an aqueous solution obtained by dissolving potassium persulfate of 2.29 g as a polymerization initiator into the refined water of 76 g is added. A mixed solution of acrylonitrile of 174.2 g as a monomer containing a nitrile radical, 2-acryloyloxy succinic acid (made by Kyoei-Sha Chemical Co., Ltd.: registered trademark, Light-acrylate HOA-MS) of 26.1 g (at a ratio of 0.037 mole per 1 mole of acrylonitrile) as a monomer which is expressed by Formula (I), and α-methyl styrenedimer of 0.174 g as a chain transfer agent is dropped for 2.5 hours while keeping the temperature of the system to 73±2° C. After completion of the dropping, the reaction is further progressed at the same temperature for 30 minutes. Subsequently, an aqueous solution obtained by dissolving potassium persulfate of 0.58 g into the refined water of 21.3 g is added to an obtained reactant in a suspension state and the temperature is raised to 83° C. and, thereafter, the reaction is progressed for 3 hours while keeping the temperature of the system to 83±3° C. After that, the system is cooled for 1 hour until the temperature reaches 40° C. and, subsequently, the agitation is stopped and the system is radiated and cooled at the room temperature for one night, thereby obtaining a reaction solution in which a binder resin composition of the invention has been precipitated. The reaction solution is suction-filtered, a collected precipitation in a wet state is cleaned three times with the refined water of 1800 g, thereafter, it is dried at 80° C. for 24 hours and is isolation-refined, thereby obtaining the binder resin composition of the invention. A yield is equal to 93% and an acid value is equal to 38 KOHmg/g (theoretical value: 34 KOHmg/g).

<PAN Resin 2>

A polyacrylonitrile resin containing no ester groups in the molecules is used.

<PVDF1, PVDF2>

PVDF1 and PVDF2 whose intrinsic viscosities differ as shown in Table 2 are used as PVDF binders. The intrinsic viscosities are measured by a method, which will be explained hereinafter.

<Measurement of Intrinsic Viscosity of PVDF Binder>

A powdery sample of 80 mg is dissolved into N,N-dimethyl formamide of 20 ml and the intrinsic viscosity is obtained in a thermostatic chamber of 30° C. by using a Ubbelohde viscometer by the following equation.

$$\eta_i = (1/C) \cdot \ln(\eta/\eta_0)$$

where, viscosity of the polymer solution
$\eta_0$: viscosity of sole N,N-dimethyl formamide
of solvent
C, 0.4 (g/dl)

Subsequently, the active material 1 having an average particle size of 11.4 which has been manufactured as a cathode active material in Synthesis 1, the active material 2 having an average particle size of 10.0 µm which has been manufactured in Synthesis 2, the active material 3 manufactured in Synthesis 3, ketjen black (KB) as a conductive material, and the binder are mixed at weight ratios shown in Table 1, N-methyl-pyrolidone is added to an obtained mixture and kneaded, and the positive electrode mixture is adjusted and produced.

Subsequently, the adjusted and produced positive electrode mixture slurry is formed onto one surface of the aluminum collector having a thickness of 20 µm so that a mixture coating amount is adjusted to be equal to 22 g/cm³ and it is dried at 80° C. Then, an obtained aluminum collector is punched into a circular shape of 15ϕ and pressed at 2000 kPa by a roll press.

Subsequently, in order to completely remove volatile components such as residual solvent and adsorbed moisture, the system is vacuum-dried under the drying conditions shown in Table 1, thereby manufacturing the positive electrodes of Examples 1 to 15 and Comparisons 1 to 10.

2. Manufacturing of Negative Electrode

As shown in Table 3, the different negative electrodes are manufactured in accordance with Examples 1 to 15 and Comparisons 1 to 10. <Negative electrode 1>, <negative electrode 2>, and <negative electrode 3> are manufactured as will be explained hereinbelow.

<Negative Electrode 1>

The granular artificial graphite negative electrode powder (BET specific surface area: 0.58 m²/g), polyvinylidene fluoride, and vapor phase epitaxy carbon fiber (made by Showa Denko, K.K.: VGCF) are mixed at ratios of 96.5 mass %, 2.5 mass %, and 1.0 mass %, respectively. Subsequently, an obtained mixture is dispersed into N-methyl-pyrolidone and the collector made of the electrolytic copper foil having a thickness of 12 µm is coated with an obtained mixture slurry so that a volume density of the negative electrode mixture is equal to 1.85 g/cm³. After the slurry is dried, N-methyl-pyrolidone is removed.

Subsequently, the resultant collector is punched into a circular shape of 14 by performing the roll press, thereby obtaining a negative electrode. The roll pressing conditions are set to 130° C. and 140 kg. Initial charge/discharge efficiency of the negative electrode is equal to 94% and a discharge capacitance of the negative electrode is equal to 347 mAh/g.

<Negative Electrode 2>

A thin film made of silicon is formed onto a copper foil having a thickness of 15 µm by a sputtering method. A film thickness is confirmed by an SEM (Scanning Electron Microscope), so that it is equal to 5.0 µm.

<Negative Electrode 3>

Cu and Sn of predetermined amounts are inserted into a high frequency melting furnace, melted, and thereafter, sprayed under an Ar atmosphere, thereby obtaining a powder material having compositions of Cu of 55 weight % and Sn of 45 weight %. A mechanical milling process is executed to the obtained powder material by a dry type attritor (made by Mitsui Kinzoku Co., Ltd.: MAID). The mechanical milling process is executed as follows. Powder materials of 1 kg of Cu and Sn are inserted into a powder tank under the Ar atmosphere. Further, hard Cr corundums each having a diameter of 9 mm are inserted as milling ball by a quantity of 18.0 kg under the Ar atmosphere. A rotational speed of an agitating arm is set to 200 rpm and the mechanical milling process is executed for 1 hour.

After the reaction, the powder is taken out of the tank and the coarse powder is removed through a sieve of 200 mesh, thereby obtaining an anode active material. Further, the anode active material of 50 mass %, artificial graphite of 45 mass % as a conductive material, and polyvinylidene fluoride of 5 mass % as a binder are mixed, thereby adjusting and producing a negative electrode mixture. An obtained mixture is dispersed into N-methyl-pyrolidone, thereby forming a negative electrode mixture slurry. Both surfaces of a collector of an electrolytic copper foil of 12 µm are coated with the negative electrode mixture slurry, they are dried, and thereafter, N-methyl-pyrolidone is removed. Subsequently, the roll press is executed and an obtained collector is punched into a circular shape of 16ϕ, thereby obtaining the negative electrode. The roll pressing conditions are set to 130° C. and 140 kg. Initial charge/discharge efficiency of the negative electrode is equal to 87% and a discharge capacitance of the negative electrode is equal to 551 mAh/g.

3. Adjustment and Production of Non-Aqueous Electrolyte

In Examples 1 to 15 and Comparisons 1 to 10, propylene carbonate of 10 mass %, ethylene carbonate of 15 mass %, methylethyl carbonate of 5 mass %, dimethyl carbonate of 69 mass %, and vinylene carbonate of 1 mass % are mixed, thereby producing a solvent. $LiPF_6$ is dissolved into such a solvent so that a mass mole concentration is equal to 1.5 mole/kg. A resultant solution is used as an electrolytic solution.

4. Assembly of Battery

Coin cells in Examples 1 to 15 and Comparisons 1 to 10 are assembled as will be described hereinbelow.

First, the electrodes obtained by the manufactured positive electrodes and negative electrodes and the separators each having a thickness of 20 μm shown in Table 4 are combined. Subsequently, a non-aqueous electrolyte obtained by the electrolytic adjustment and production is added to such a combination, thereby manufacturing the coin cells in Examples 1 to 15 and Comparisons 1 to 10.

5. Battery Performance Evaluation

Subsequently, a battery performance evaluation, which will be explained hereinbelow, is made to the manufactured coin cells in Examples 1 to 15 and Comparisons 1 to 10.

<Battery Performance Evaluation>

In the manufactured lithium ion secondary batteries, charge/discharge cycles are measured at a high temperature of 60° C. The charge is performed by a constant current/constant voltage system. Specifically speaking, in the first to third cycles, the charge is performed by 1 mA until the charge voltage shown in Table 5 is obtained. At this voltage, the constant voltage charge is executed and the battery is charged until the charge current decreases to 0.01 mA.

An open circuit time of 10 minutes is provided between the charge and the discharge and the discharge is performed by 1 mA. It is assumed that when the voltage reaches 3.0V, the discharge of one cycle is finished. After the third cycle, the charge/discharge are performed by 2 mA. The charge/discharge of 60 cycles are executed. A first-time discharge capacitance (mAh/g), first-time charge/discharge efficiency (%), and a capacitance maintaining ratio (%) at the 60th cycle (discharge capacitance at the 60th cycle)/(discharge capacitance at the 3rd cycle) (%) are evaluated.

Table 5 shows results of the battery performance evaluation made to Examples 1 to 15 and Comparisons 1 to 10.

TABLE 5

| | Charge voltage (V) | Capacitance maintaining ratio (%) | First-time discharge capacitance (mAh/g) | First-time charge/discharge efficiency (%) |
|---|---|---|---|---|
| Example 1 | 4.35 | 85.4 | 171 | 90.8 |
| Example 2 | 4.35 | 88.3 | 170.4 | 89.3 |
| Example 3 | 4.35 | 86.4 | 173 | 91.2 |
| Example 4 | 4.35 | 87.5 | 169.4 | 89.4 |
| Example 5 | 4.35 | 87.4 | 172.3 | 91.5 |
| Example 6 | 4.35 | 87.4 | 174.5 | 90.9 |
| Example 7 | 4.25 | 91.2 | 160.3 | 90.9 |
| Example 8 | 4.45 | 77.6 | 183.7 | 89.1 |
| Example 9 | 4.55 | 80.1 | 193.4 | 86.2 |
| Example 10 | 4.35 | 85.1 | 176.4 | 90.2 |
| Example 11 | 4.35 | 84.7 | 186.5 | 90.5 |
| Example 12 | 4.35 | 80.7 | 172.9 | 90.8 |
| Example 13 | 4.35 | 70.3 | 188.3 | 90.1 |
| Example 14 | 4.35 | 75.4 | 186.8 | 89.8 |
| Example 15 | 4.35 | 80.1 | 168 | 90.5 |
| Comparison 1 | 4.35 | 78.9 | 171.2 | 90.6 |
| Comparison 2 | 4.35 | 78.5 | 169.52 | 89.7 |
| Comparison 3 | 4.2 | 88.6 | 172.3 | 89.4 |
| Comparison 4 | 4.2 | 87.6 | 145.7 | 89.3 |
| Comparison 5 | 4.2 | 88.4 | 151.8 | 90.6 |
| Comparison 6 | 4.25 | 88.2 | 158.2 | 90.2 |
| Comparison 7 | 4.45 | 72.5 | 182.5 | 89.1 |
| Comparison 8 | 4.55 | 70.6 | 192.7 | 85.3 |
| Comparison 9 | 4.25 | 70.2 | 160.2 | 98.2 |
| Comparison 10 | 4.45 | 72.5 | 159.5 | 98.1 |

6. Examination Results

Examination of Effects of PAN Resin

As shown in Table 5, the capacitance maintaining ratios at 4.35V of Examples 1 to 5 are higher than those of Comparisons 1 and 2. In Example 1, the PAN resin 1 is solely used as a binder. In Examples 2 to 5, the PAN resin 1 and the PVDF resin are used as binders. Therefore, it will be understood that in the case of the battery containing the PAN resin as a binder, the capacitance maintaining ratio at 4.35V is higher than that of the battery solely containing the PVDF resin.

As shown in Table 5, when the capacitance maintaining ratio at 4.20V of Comparison 3 is compared with the capacitance maintaining ratios at 4.20V of Comparisons 4 and 5, there is little difference. In Comparison 3, the PAN resin 1 is used as a binder. In Comparison 4, PVDF1 is used as a binder. In Comparison 5, PVDF2 is used as a binder. Therefore, it will be understood that the PAN resin has the good capacitance maintaining ratio at a charge voltage higher than 4.20V in particular.

Examination of Compositions of Binder

As shown in Table 5, the capacitance maintaining ratios at 4.35V of Examples 2 to 5 are higher than the capacitance maintaining ratio at 4.35V of Example 1. In Example 1, the PAN resin is used as a binder. In Examples 2 to 5, a mixture of the PAN resin and PVDF is used as a binder. Therefore, it will be understood that in the case of the binder using the mixture of the PAN resin and PVDF, the better capacitance maintaining ratio is obtained at the charge voltage of 4.35V as compared with that in the case of solely using the PAN resin as a binder.

Examination of Drying Conditions Upon Manufacturing Positive Electrode

As shown in Table 5, the capacitance maintaining ratio at 4.35V of Example 6 is higher than that at 4.35V of Example 1. Example 6 is obtained under the drying conditions of 150° C. and 12 hours. Example 1 is obtained under the drying conditions of 120° C. and 12 hours. Therefore, it will be understood that in the case of the battery in which the positive electrode is manufactured under the drying conditions of 150° C. and 12 hours, a better capacitance maintaining ratio is obtained.

Examination of Charge Voltage

As shown in Table 5, the capacitance maintaining ratios resulting when the charge/discharge have been executed at charge cut-off voltages of 4.25V, 4.45V, and 4.55V are shown in Examples 7 to 9. The capacitance maintaining ratios as results in which the battery using PVDF1 has been executed at the charge cut-off voltages of 4.25V, 4.45V, and 4.55V are shown in Comparisons 6 to 8. It will be understood that in the case of Examples 7 to 9, the batteries have the better capacitance maintaining ratios than those in Comparisons 6 to 8.

Examination of Compositions of Active Material

As shown in Table 5, the first-time discharge capacitance at 4.35V of Example 11 is larger than those of Example 10. In Example 10, a material in which the active material 1 and the active material 2 are mixed at a weight ratio of (1:1) is used as a cathode active material. In Example 11, the active material 2 is solely used as a cathode active material.

Examination of Separator

As shown in Table 5, the capacitance maintaining ratio at 4.35V of Example 12 is smaller than that at 4.35V of Example 3. In Example 3, the surface of the laminate type separator is made of polypropylene and its air permeability is equal to almost about 500 s. In Example 12, polyethylene is used as a separator whose air permeability is equal to almost about 500 s in a manner similar to Example 3. Therefore, it will be understood that in the case of the battery using the laminate type separator whose surface is made of polypropylene, the better capacitance maintaining ratio is obtained at a charge upper limit voltage of 4.35V.

Examination of Negative Electrode

In Examples 13 and 14, anode active materials other than the anode active material made of carbon are used. As shown in Table 5, it will be understood that in the case of the battery using the anode active material made of carbon, the better capacitance maintaining ratio is obtained.

Examination of PAN Resin

As shown in Table 5, the capacitance maintaining ratio at 4.35V of Example 15 is higher than the capacitance maintaining ratios of Comparisons 1 and 2. On the other hand, the capacitance maintaining ratio at 4.35V of Example 15 is lower than that of Example 1.

In Example 15, a binder of a polymer solely using PAN is used as a binder. Therefore, it will be understood that the battery of the polymer solely using PAN has the better battery characteristics as compared with that of the battery using PVDF as a binder. It should be appreciated that in the case of the battery of the polymer solely using the PAN resin containing the ester group as a binder, the better battery characteristics is obtained as compared with that of the battery solely using PAN.

In Comparison 9, PVDF1 is used for an olivin positive electrode. In Comparison 10, the PAN resin 1 is used for the olivin positive electrode. It should be appreciated that in both Comparisons 9 and 10, there is no change in the capacitance maintaining ratio.

Various modifications and applications of the embodiment are possible within the scope and spirit of the invention. For example, the lithium ion secondary battery is constructed by the positive electrode, negative electrode, non-aqueous electrolytic solution, and separator for separating the positive electrode and the negative electrode. Its shape is not particularly limited but any one of a cylindrical type, a rectangular type, a coin type, a button type, and the like can be used.

The lithium ion secondary battery may be constructed in such a manner that, for example, the safety is improved by providing a current breaker mechanism for breaking a current in the battery in accordance with an increase in inner pressure of the battery at the time of an abnormality such as an overcharge or the like.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A lithium ion secondary battery comprising:
   a positive electrode comprising a cathode active material and a binder;
   a negative electrode;
   an electrolyte; and
   a separator which is arranged between said positive electrode and said negative electrode,
   wherein an open circuit voltage per unit cell in a fully charged state lies within a range from 4.25V or more to 6.00V or less,
   wherein said cathode active material contains either
      a lithium-cobalt composite oxide expressed by a general formula: $Li_aCo_{1-x}Me_xO_{2-b}$ in which Me denotes metal elements of at least one kind or two or more kinds selected from vanadium V, copper Cu, zirconium Zr, zinc Zn, magnesium Mg, aluminum Al, and iron Fe; a is set to a value of $0.9 \leq a \leq 1.1$; x is set to a value of $0 \leq x \leq 0.3$; and b is set to a value of $-0.1 \leq b \leq 0.1$,
      or a lithium-cobalt-nickel-manganese oxide expressed by a general formula: $Li_aNi_{1-x-y-z}Co_xMn_yMe_zO_{2-b}$ in which Me denotes metal elements of at least one kind or two or more kinds selected from vanadium V, copper Cu, zirconium Zr, zinc Zn, magnesium Mg, aluminum Al, and iron Fe; a is set to a value of $0.9 \leq a \leq 1.1$; x is set to a value of $0 < x < 0.4$; y is set to a value of $0 < y < 0.4$; z is set to a value of $0 < z < 0.3$; and b is set to a value of $-0.1 \leq b \leq 0.1$, and
   wherein said binder contains a polyacrylonitrile resin, and
   wherein said polyacrylonitrile resin includes an ester group.

2. The battery according to claim 1, wherein said open circuit voltage lies within a range from 4.25V or more to 4.55V or less.

3. The battery according to claim 1, wherein said binder further contains a vinylidene fluoride polymer.

4. The battery according to claim 3, wherein in said binder, a weight % of said vinylidene fluoride polymer to said polyacrylonitrile resin lies within a range from 1% or more to 99% or less.

5. The battery according to claim 1, wherein said polyacrylonitrile resin is a copolymer of acrylonitrile units and other monomer units, a homopolymer of acrylonitrile, or a modificated polymer of said copolymer or homopolymer.

6. The battery according to claim 1, wherein at least polypropylene is contained in a surface of said separator which is come into contact with said positive electrode and or said negative electrode.

7. A lithium ion secondary battery comprising:
   a positive electrode comprising a cathode active material and a binder;
   a negative electrode;
   an electrolyte; and
   a separator which is arranged between said positive electrode and said negative electrode,
   wherein an open circuit voltage per unit cell in a fully charged state lies within a range from 4.25V or more to 6.00V or less,
   wherein said cathode active material contains either
      a lithium-cobalt composite oxide expressed by a general formula: $Li_aCo_{1-x}Me_xO_{2-b}$ in which Me denotes metal elements of at least one kind or two or more kinds selected from vanadium V, copper Cu, zirconium Zr, zinc Zn, magnesium Mg, aluminum Al, and iron Fe; a is set to a value of $0.9 \leq a \leq 1.1$; x is set to a value of $0 \leq x \leq 0.3$; and b is set to a value of $-0.1 \leq b \leq 0.1$,
      or a lithium-cobalt-nickel-manganese oxide expressed by a general formula: $Li_aNi_{1-x-y-z}Co_xMn_yMe_zO_{2-b}$ in which Me denotes metal elements of at least one kind or two or more kinds selected from vanadium V, copper Cu, zirconium Zr, zinc Zn, magnesium Mg, aluminum Al, and iron Fe; a is set to a value of $0.9 \leq a \leq 1.1$; x is set to a value of $0 < x < 0.4$; y is set to a value of $0 < y < 0.4$; z is set to a value of $0 < z < 0.3$; and b is set to a value of $-0.1 \leq b \leq 0.1$, and wherein said binder contains a polyacrylonitrile resin,
wherein said electrolyte contains vinylene carbonate.

8. A positive electrode comprising a cathode active material and a binder,
wherein said cathode active material contains either
a lithium-cobalt composite oxide expressed by a general formula: $Li_aCo_{1-x}Me_xO_{2-b}$ in which Me denotes metal elements of at least one kind or two or more kinds selected from vanadium V, copper Cu, zirconium Zr, zinc Zn, magnesium Mg, aluminum Al, and iron Fe; a is set to a value of $0.9 \leqq a \leqq 1.1$; x is set to a value of $0 \leqq x \leqq 0.3$; and b is set to a value of $-0.1 \leqq b \leqq 0.1$,
or a lithium-cobalt-nickel-manganese oxide expressed by a general formula: $Li_aNi_{1-x-y-z}Co_xMn_yMe_zO_{2-b}$ in which Me denotes metal elements of at least one kind or two or more kinds selected from vanadium V, copper Cu, zirconium Zr, zinc Zn, magnesium Mg, aluminum Al, and iron Fe; a is set to a value of $0.9 \leqq a \leqq 1.1$; x is set to a value of $0<x<0.4$; y is set to a value of $0<y<0.4$; z is set to a value of $0<z<0.3$; and b is set to a value of $-0.1 \leqq b \leqq 0.1$, and
wherein said binder contains a polyacrylonitrile resin, wherein said polyacrylonitrile resin includes an ester group.

9. The positive electrode according to claim 8, wherein said binder contains a vinylidene fluoride polymer.

10. The positive electrode according to claim 9, wherein in said binder, a weight % of said vinylidene fluoride polymer to said polyacrylonitrile resin lies within a range from 1% or more to 99% or less.

11. The positive electrode according to claim 8, wherein said polyacrylonitrile resin is a copolymer of acrylonitrile units and other monomer units, a homopolymer of acrylonitrile, or a modified polymer of said copolymer or homopolymer.

* * * * *